UNITED STATES PATENT OFFICE.

PAUL ERWIN OBERREIT, VIKTOR VILLIGER, AND PAUL NAWIASKY, OF LUDWIGS-HAFEN-ON-THE-RHINE, GERMANY, ASSIGNORS TO BADISCHE ANILIN & SODA FABRIK, OF LUDWIGSHAFEN-ON-THE-RHINE, GERMANY, A CORPORATION.

HALOGENATED INDIGO AND PROCESS OF MAKING.

948,241.   Specification of Letters Patent.   Patented Feb. 1, 1910.

No Drawing.   Application filed September 30, 1909. Serial No. 520,351.

*To all whom it may concern:*

Be it known that we, PAUL ERWIN OBERREIT, Ph. D., VIKTOR VILLIGER, Ph. D., and PAUL NAWIASKY, Ph. D., chemists, subjects the first and third, respectively, of the King of Saxony and the Emperor of Austria-Hungary, the second a citizen of the Swiss Republic, residing at Ludwigshafen-on-the-Rhine, Germany, have invented new and useful Improvements in Halogenated Indigo and Processes of Making Same, of which the following is a specification.

Our invention relates to the production of a new tetra-halogenated indigo, namely 7.7'-dichlor-5.5'-dibrom-indigo.

We can prepare our new tetra-halogen indigo by the saponification and oxidation of the methyl ester of 7-chlor-5-brom-indoxyl-carboxylic acid.

Our new 7.7'-dichlor-5.5'-dibrom-indigo is characterized by possessing the following properties. It dyes cotton blue and yields a blue solution in cold concentrated sulfuric acid. It is soluble in boiling dimethyl anilin, and on being oxidized with concentrated nitric acid in concentrated sulfuric acid solution it yields 3-chlor-5-brom-isatoic acid, which acid melts and decomposes at about 260° C.

The following example will serve to illustrate further the nature of our invention, which, however, is not confined to this example. The parts are by weight.

Example: Introduce, while stirring, three hundred and thirty-six and one half parts of the methyl ester of 4-brom-6-chlor-phenyl-glycin-2-carboxylic acid (obtainable by esterifying the 4-brom-6-chlor-phenyl-glycin-2-carboxylic acid which can be produced by treating phenyl-glycin-2-carboxylic acid first with bromin and then with chlorin) into a solution of twenty-three parts of sodium in seven hundred parts of methyl alcohol, and maintain the whole at seventy degrees centigrade for thirty minutes. Distil off the methyl alcohol, digest the residue with one thousand parts of water and two hundred parts of thirty per cent. acetic acid, and filter off and wash and dry the 5-brom-7-chlor-indoxyl carboxylic acid ester, which can be recrystallized from glacial acetic acid and thus be obtained in the form of long needles which melt at from about two hundred and three, to two hundred and five, degrees centigrade. The ester is insoluble in water and is difficultly soluble in most of the common organic solvents. It can be converted into the corresponding indigo coloring matter by boiling three hundred and four and one half parts of it with five thousand parts of water and eleven hundred and forty-five parts of thirty-five per cent. caustic soda for thirty minutes, while passing a current of coal gas through the solution. Then add seven thousand parts of boiling water to the mixture and pass air through it, at a temperature of about one hundred degrees centigrade, until the oxidation is complete. If desired, the saponification can be carried out in the absence of coal gas, and instead of caustic soda, other saponifying agent, for instance caustic potash, can be employed. The dichlor-dibrom-indigo thus obtained dyes cotton, from the vat, brilliant blue shades. It is soluble in boiling dimethyl-anilin and crystallizes from it in small blue needles. We term it 7.7'-dichlor-5.5'-dibrom-indigo. It possesses a constitution corresponding to the formula

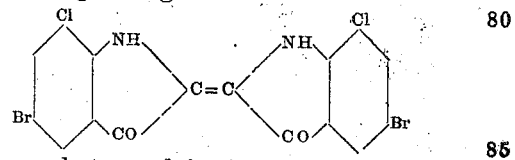

Now what we claim is:—

1. As a new article of manufacture 7.7'-dichlor-5.5'-dibrom-indigo, which is soluble in boiling dimethyl-anilin, which yields a blue solution in concentrated sulfuric acid, which dyes cotton blue, and which on oxidation by means of concentrated nitric acid in concentrated sulfuric acid solution yields 3-chlor-5-brom-isatoic acid, which acid melts and decomposes at a temperature of about 260° C.

2. The process of producing 7.7'-dichlor-5.5'-dibrom-indigo by saponifying and oxidizing the methyl ester of 7-chlor-5-brom-indoxyl-carboxylic acid substantially as described.

In testimony whereof we have hereunto set our hands in the presence of two subscribing witnesses.

PAUL ERWIN OBERREIT.
VIKTOR VILLIGER.
PAUL NAWIASKY.

Witnesses:
ERNEST F. EHRHARDT,
ERNEST L. IVES.